US006396982B1

(12) United States Patent
Lin (10) Patent No.: US 6,396,982 B1
(45) Date of Patent: May 28, 2002

(54) BIMETAL-BASED TEMPERATURE STABILIZED MULTI-FBG PACKAGE WITH TUNABLE MECHANISM

(75) Inventor: I-En Lin, Mounli (TW)

(73) Assignee: Rich Key Technologies Limited, Mounli (TW)

( * ) Notice: Subject to any disclaimer, the term of this patent is extended or adjusted under 35 U.S.C. 154(b) by 63 days.

(21) Appl. No.: 09/630,186

(22) Filed: Aug. 1, 2000

(51) Int. Cl.$^7$ ................................................. G02B 6/34
(52) U.S. Cl. .......................................... 385/37; 385/136
(58) Field of Search ............................ 385/37, 137, 136

(56) References Cited

U.S. PATENT DOCUMENTS

| | | | |
|---|---|---|---|
| 5,469,520 A | * 11/1995 | Morey et al. | 359/130 |
| 6,055,348 A | * 4/2000 | Jin et al. | 359/130 |
| 6,148,128 A | * 11/2000 | Jin et al. | 359/130 |
| 6,154,590 A | * 11/2000 | Jin et al. | 359/130 |

* cited by examiner

*Primary Examiner*—Hung N. Ngo
(74) *Attorney, Agent, or Firm*—Intellectual Property Solutions, P.L.L.C.

(57) ABSTRACT

A bimetal-based temperature stabilized multi-FBG package with tunable mechanism mainly includes a moving pin, a bimetal fixture, a rotation sleeve, a locking pin. The moving pin has a first predetermined outer screw pitch at one end and an elongated slot at the other end for receiving the locking pin. The bimetal fixture has a main frame and a plate secured to the main frame. The main frame of the bimetal fixture has a tube member extending outwardly from the side wall thereof, and the tube member has a second predetermined outer screw pitch at the distal end thereof. The rotation sleeve has a first predetermined inner thread corresponding to the first predetermined outer screw pitch of the moving pin and a second predetermined inner thread corresponding to the second predetermined outer screw pitch of the bimetal fixture. The grating fiber is first placed inside the moving pin and then the fiber is metallized or soldered to the moving pin and the holding arm of the bimetal fixture. The slot of the moving pin is guided by the locking pin which enables the linear movement of the moving pin. When the locking pin is in position, the moving pin cannot self-rotate, so rotating the sleeve in one cycle will make the moving pin has a movement of the second predetermined outer screw pitch minus the first predetermined outer screw pitch. Once the locking pin is rotated outwardly not to guide the slot, rotating the rotation sleeve 30 in 360 degrees will result in the second predetermined outer screw pitch (0.4 mm) movement of the moving pin, which called "quick movement".

5 Claims, 6 Drawing Sheets

| | KOVAR (MATERIAL 2) | GRATING FIBER | SUS304 (MATERIAL 1) |
|---|---|---|---|
| THERMAL EXPANSION COEFFICIENT (m/m°C) | 1.2E-6 | 5.5E-7 | 1.05E-5 |
| YOUNG'S MODULUS, E (N/m²) | 1.40E11 | 0.92E10 | 2.0E11 |
| CROSS SECTION (m²) | | 1.227E-8 | |
| THICKNESS (10⁻³m) | 1.0 | | |

Fig.9

BIMETAL-BASED TEMPERATURE STABILIZED MULTI-FBG PACKAGE WITH TUNABLE MECHANISM

BACKGROUND OF THE INVENTION

1. Field of the Invention

The present invention generally relates to optical filters, and more particularly to improved accuracy filtering devices including Bragg filters incorporated in optical waveguides, especially in optical fibers.

2. Description of the Related Art

The advent of wavelength-division-multiplexing (WDM) as the technology of choice for upgrading the capacity of fiberoptic networks has created a demand for devices and components capable of pushing that capacity to its limit. Fiber gratings are well suited for the challenge, due to their inherently narrowband—almost square—wavelength response function. Fiber gratings also find other uses in communication systems, for example, as gain equalizers, where their spectral profile is made to match the gain curve of an erbium-doped fiber amplifier. Linearly chirped gratings are also used as dispersion compensators. In these applications of FBGs, a problem arising from changes in the surrounding temperature has been observed. Because the spacing of Bragg grating determines the central wavelength of the reflected optical signal transmitted in an optical fiber, the FBGs are carefully designed and accurately manufactured. The problem is that the optical fibers elongate in a raised surrounding temperature so that the reflected wavelength deviates from the design value. These variations which can be as small as 50 GHz (0.4 nm) are undesirable for the narrow channel spacings used in high-performance systems. Thus, reducing the thermal variability of FBGs is a key to commercial success in the telecommunications industry.

FBGs can be fabricated by interferometric or phase-mask techniques. However, packaging is a vital technology, which makes FBGs suitable in real-world applications. Baking, laser welding, epoxing, and re-coating can result in the deviation of desired central wavelength. Thus, a packaging device designed with a post-tuning mechanism is necessary. To compensate the FBGs thermal wavelength shift, a mechanism that has positive and negative thermal effects is desirable. One of the methods to achieve this object is to include a press-stressed mechanism in the packaging device.

There are already known various constructions of optical filters, among them such which utilize the Bragg effect for wavelength selective filtering. U.S. Pat. No. 4,725,110, issued on Feb. 16, 1988, discloses an example of a method for incorporating an optical filter of this type in an optical fiber. This method involves imprinting at least one periodic grating in the core of the optical fiber by exposing the core through the cladding to the interference pattern of two ultraviolet beams that are directed against the optical fiber at two angles relative to the fiber axis that complement each other to 180 degree. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is substantially transparent to light at wavelengths outside the aforementioned narrow band so that it does not affect the further propagation of such other light. The incorporated periodic grating of this kind thus produces a narrow transmission notch and a commensurately narrow reflection peak in the spectrum of the light propagating in the optical fiber in one or the other of its longitudinal directions. The frequency of the light affected in this manner by the incorporated periodic grating is related to the periodicity of the grating in a manner explained in the above patent.

The optical fiber with the incorporated grating filter obtained in the above manner is well suited for use as a strain or temperature sensor because the frequency of the light reflected by the grating varies either with the strain to which the grating region is subjected, or with the temperature of the grating region, in a clearly defined relationship, which is substantially linear at least within the range of interest, to either one of these parameters. It is also possible to employ this kind of a sensor in an environment where both the strain of the grating region due to external forces imposed on the fiber, and the temperature of the grating region, vary with time in a manner that is not necessarily concurrent, and to separately evaluate the reflected wavelength changes attributable to the grating region strain, on the one hand, and the grating region temperature, on the other hand, in a manner that is also discussed in the above patent.

As advantageous as the incorporated optical core grating filter of the above type is for use in the above and similar applications, there are other applications which would greatly benefit from the use of such a filter but for which the above filter is not suited in its basic form disclosed in the above patent, for the very reason that enables it to serve as a temperature sensor, that is, the temperature dependency of the wavelength of the light reflected thereby. Inasmuch as the frequency of the light reflected by such optical filter varies with the temperature of the grating region, this basic filter cannot be used in applications where the reflected light frequency is to be independent of temperature. This precludes the use of the basic filter as a frequency standard and in similar applications.

U.S. Pat. No. 5,042,898, issued to Morey et al. on Aug. 27, 1991, discloses a cylindrical package comprising two materials with different thermal-expansion coefficients. The changes of fiber longitudinal strain can be compensated by a grating embedded component. The disclosed temperature compensated optical waveguide device is based on the concept that changes or shifts in wavelength attributable to changing optical grating strains can be used to counteract and/or eliminate shifts in wavelength resulting from variations in the optical grating temperature. For example, a constant wavelength of reflected light may be maintained during a drop in temperature by increasing the longitudinal strain on the fiber, and vice versa. In the compensation device described in U.S. Pat. No. 5,042,898, a portion of the optical fiber containing the embedded grating is sectioned off by securing the optical fiber at each side of the grating to separate metallic compensating sections arranged for longitudinal movement relative to one another. By mechanically adjusting the compensating members longitudinally relative to each other to thereby vary the distance between them, there is imposed on the optical grating a longitudinal strain of a magnitude that varies in a manner to balance out or compensate for wavelength variations resulting from changes in the temperature of the grating. This prior art temperature compensating waveguide device arrangement is, however, cumbersome and expensive to manufacture. Recently Corning Inc. has used a packaging substrate with negative thermal expansion coefficient in the fiber grating. The long-term reliability is being investigated. However, a more compact package with tunable mechanism and low temperature dependency is needed in the market.

SUMMARY OF THE INVENTION

It is a primary object of the present invention to provide a bimetal-based temperature stabilized multi-FBG package with tunable mechanism, in which very fine fiber grating can be obtained.

It is another object of the present invention to provide a bimetal-based temperature stabilized multi-FBG package with tunable mechanism, which is easy to use and the fiber therein will not be twisted It is a further object of the present invention to provide a bimetal-based temperature stabilized multi-FBG package with tunable mechanism, in which the device is very compact.

It is a further object of the present invention to provide a bimetal-based temperature stabilized multi-FBG package with tunable mechanism, in which the grating length ($L_f$) can be adjusted directly by the moving pin to control the degree of over/under compensations, caused by fabrication imperfection.

According to the present invention, the device mainly includes a moving pin, a bimetal fixture, a rotation sleeve, a locking pin. The moving pin has a first predetermined outer screw pitch, for example 0.35 mm pitch, at one end and an elongated slot at the other end for receiving the locking pin. The bimetal fixture has a main frame and a plate secured to the main frame. The thermal expansion coefficient of the main frame is smaller than that of the plate. The main frame of the bimetal fixture has a tube member extending outwardly from the side wall thereof, and the tube member has a second predetermined outer screw pitch, for example 0.4 mm pitch, at the distal end thereof. A hole is formed on the side wall for receiving the locking pin. The rotation sleeve has a first predetermined inner thread corresponding to the first predetermined outer screw pitch of the moving pin and a second predetermined inner thread corresponding to the second predetermined outer screw pitch of the bimetal fixture.

The grating fiber is first placed inside the moving pin and then the fiber is metallized or soldered to the moving pin and the holding arm of the bimetal fixture. The slot of the moving pin is guided by the locking pin which enables the linear movement of the moving pin. The moving pin is disposed between the rotation sleeve and bimetal fixture with one end inserted into the bimetal fixture and the other end is screwed into the first predetermined inner thread, and then the second predetermined inner thread of the rotation sleeve is screwed onto the second predetermined outer screw pitch of the bimetal fixture. When the locking pin is in position, the moving pin cannot self-rotate, so rotating the sleeve in one cycle will make the moving pin has a movement of the second predetermined outer screw pitch minus the first predetermined outer screw pitch, that is, 0.4 mm−0.35 mm=0.05 mm. Once the locking pin is rotated outwardly not to guide the slot, rotating the rotation sleeve 30 in 360 degrees will result in the second predetermined outer screw pitch (0.4 mm) movement of the moving pin, which called "quick movement". The moving pin and the rotation sleeve are made by kovar with very low thermal expansion coefficient.

It should be appreciated that the above embodiment of the present invention provide the temperature-compensating devices with a tunable mechanism for optical fiber gratings, wherein the grating can be tuned with a very fine adjustment when the locking pin engages with the slot of the moving pin or the grating can be tuned with a relatively quick adjustment when the locking pin does not engage with the slot of the moving pin. In additions, a more compact package with a tunable mechanism and low temperature dependency is provided to overcome the disadvantages of the conventional devices.

BRIEF DESCRIPTION OF THE DRAWINGS

Other objects, advantages, and novel features of the invention will become more apparent from the following detailed description when taken in conjunction with the accompanying drawings.

FIG. 7 is a schematic diagram showing the influences of (a) holding arm length, (b) $h_1/h_2$ ratio, and (c) fiber length on the change of Bragg wavelength. The computed results based on the conditions that central wavelength is 1540 nm and temperature change is +65° C. Effects of $\alpha_{eff}$ and $\alpha_F$ is also included;

DETAILED DESCRIPTION OF THE PREFERRED EMBODIMENTS

Figure 1:
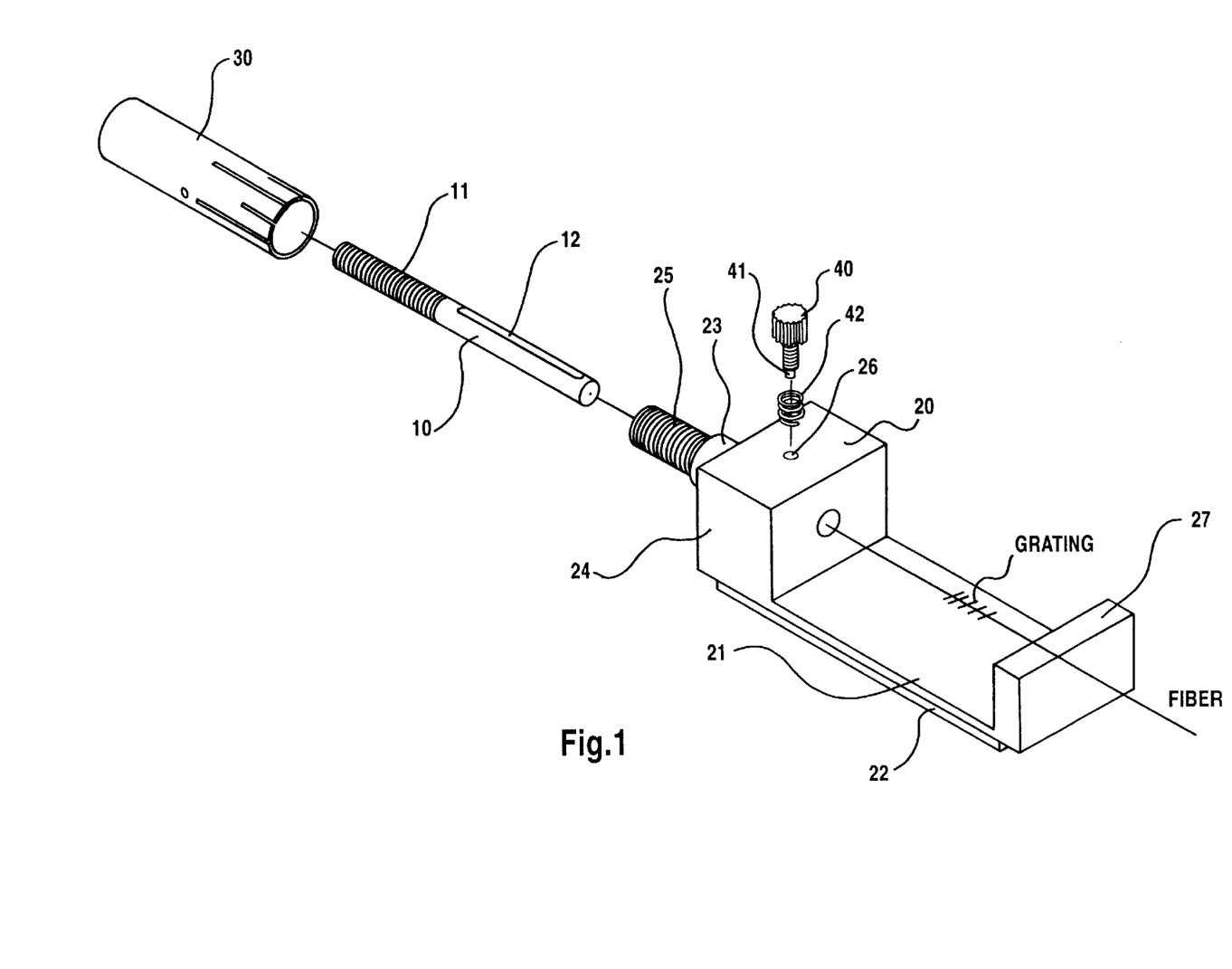
FIG. 1 is an exploded view of the bimetal-based temperature stabilized multi-FBG package with tunable mechanism in accordance with an embodiment of the present invention.
Figure 2:
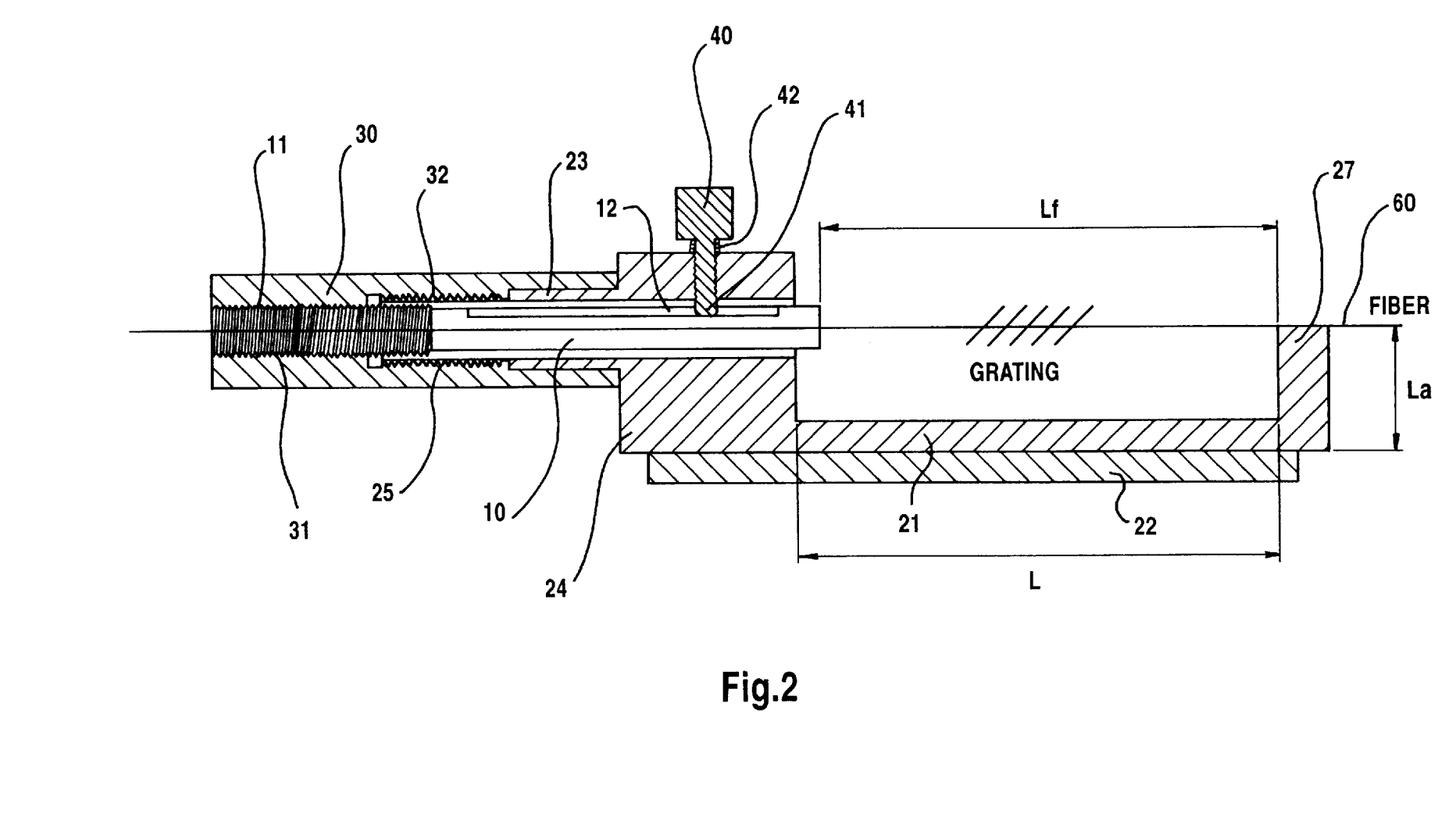
FIG. 2 is a longitudinal cross sectional view of the embodiment of the present invention.

FIG. 1 illustrates an exploded view of the bimetal-based temperature stabilized multi-FBG package with tunable mechanism in accordance with the embodiment of the present invention and FIG. 2 illustrates a longitudinal cross sectional view thereof. The device mainly includes a moving pin 10, a bimetal fixture 20, a rotation sleeve 30, a locking pin 40. The moving pin 10 has a first predetermined outer screw pitch 11, for example 0.35 mm pitch, at one end and an elongated slot 12 at the other end for receiving the locking pin 40. The bimetal fixture 20 has a main frame 21 and a plate 22 secured to the main frame 21. The thermal expansion coefficient of the main frame 21 is smaller than that of the plate 22. The main frame 21 of the bimetal fixture 20 has a tube member 23 extending outwardly from the side wall 24 thereof, and the tube member 23 has a second predetermined outer screw pitch 25, for example 0.4 mm pitch, at the distal end thereof. A hole 26 is formed on the side wall 24 for receiving the locking pin 40. Preferably, a spring 42 is disposed between the locking pin 40 and the hole 26 of the bimetal fixture 20. The rotation sleeve 30 has a first predetermined inner thread 31 corresponding to the first predetermined outer screw pitch 11 of the moving pin 10 and a second predetermined inner thread 32 corresponding to the second predetermined outer screw pitch 25 of the bimetal fixture 20. A plurality of marks 33 are provided on the rotation sleeve 30 for indicating the rotation angles of the sleeve 30.

As shown in FIG. 2, the grating fiber 60 is first placed inside the moving pin 10 and then the fiber 60 is metallized or soldered to the moving pin 10 and the holding arm 27 of the bimetal fixture 20. The slot 12 of the moving pin 10 is guided by the extending end 41 of the locking pin 40 which enables the linear movement of the moving pin 10. The moving pin 10 is disposed between the rotation sleeve 30 and bimetal fixture 20 with one end inserted into the bimetal fixture 20 and the other end is screwed into the first predetermined inner thread 31, and then the second predetermined inner thread 32 of the rotation sleeve 30 is screwed onto the second predetermined outer screw pitch 25 of the bimetal fixture 20. When the locking pin 40 is in position, the moving pin 10 cannot self-rotate, so rotating the sleeve 30 in one cycle will make the moving pin 10 has a movement of the second predetermined outer screw pitch 25 minus the first predetermined outer screw pitch 11, that is, 0.4 mm−0.35 mm=0.05 mm. Once the locking pin 40 is rotated outwardly not to guide the slot 12, rotating the rotation sleeve 30 in 360 degrees will result in the second predetermined outer screw pitch 11 (0.4 mm) movement of the moving pin 10, which called "quick movement". The moving pin 10 and the rotation sleeve 30 are made by kovar with very low thermal expansion coefficient.

It should be appreciated that the above embodiment of the present invention provide the temperature-compensating devices with a tunable mechanism for optical fiber gratings, wherein the grating can be tuned with a very fine adjustment when the locking pin 40 engages with the slot 12 of the moving pin 10 or the grating can be tuned with a relatively quick adjustment when the locking pin 40 does not engage with the slot 12 of the moving pin 10. In additions, a more compact package with a tunable mechanism and low temperature dependency is provided to overcome the disadvantages of the conventional devices.

The followings will detailedly explain the temperature compensation for the devices of the present invention.

The material expansion constants and lengths required to cancel the temperature effect can be calculated as follows:

The free space Bragg wavelength is given by:

$$\lambda = 2n\Lambda \quad (1)$$

where n is the refractive index of the fiber core and $\Lambda$ is the spacing of the Bragg grating. The change in Bragg wavelength for a temperature change $\Delta T$ from ambient is given by 1

$$\frac{\Delta \lambda}{\lambda} = \Delta \lambda_T + \Delta \lambda_P \quad (2)$$

where $\alpha\lambda_T$ is the temperature contribution and $\alpha\lambda_P$ represents thermal induced elastic structure deformation acting on grating fiber.

We further decomposed that the change of Bragg wavelength is linear function of $\Delta T$ and $\Delta F$.

$$\alpha\lambda_T = (\alpha_1 + \xi)\Delta T = \alpha_{eff}\Delta T$$

$$\Delta\lambda_P = \Delta_F \Delta F \quad (3)$$

where $\alpha_f$ is the linear thermal expansion coefficient of the fiber core and $\xi$ is the thermal coefficient of the refractive index of the fiber core. $\alpha_{eff}$ is the effective temperature coefficient, for example $\alpha_{eff}=7.1\times10^{-6}/°$ C. $\Delta F$ is the resultant force acted on the grating fiber due to thermally induced structure deformation. $\alpha_F$ is called force constant and serve as the relation between change of resonant wavelength and external force. For a zero wavelength shift or a very low temperature dependency, we must have the condition $$\alpha\lambda_T + \Delta\lambda_P = 0 \quad (4)$$

Three factors affect the FBGs compensated package: pre-stress force, arm height, and size of bi-metal cantilever beam.

Pre-stress Force

Pre-stress is required in the compensated device due to dis-similiar nature of grating under tension and compression conditions. The axial force acting on the grating fiber need to be controlled precisely so the compensate device have the best perform mode. The pulling force measured in the tuning-cylinder side ($F_P$) is related to fiber force ($F_f$) by $$\frac{F_P \cdot L_f}{E_f \cdot A_f} = \frac{F_f \cdot L_a}{3E_a \cdot I_a} + \frac{F_f \cdot L}{E_{b1}A_{b1} + E_{b2}A_{b2}} + \frac{F_f \cdot L_f}{E_f A_f}. \quad (5)$$

The axial deformation in the fiber due to applied pulling force is equal to the sum of deformations contributed by holding arm 27, bimetal beam 20, and grating fiber 60. The subscripts, f, b1, b2, and a used in this equation represent fiber, bimetal beam (1 and 2), and holding arm respectively. F, E, A, and L denote force, Young's modulus, cross section area, and length of their representative parts. Since holding arm will share some of the applied force, $F_P$ must be larger than $F_f$ when grating fiber is under pre-stressed condition. Eq.5 is also used to compute the force constant, $\alpha_F$, when applied force $F_P$ is controlled.

Bimetal Bending With Holding Arm

From the strain compatibility relation, the strains between two strips of bimetal beam must be the same during the temperature rise. Thus, $$\frac{F}{E_1Bh_1} + \frac{F\left(\frac{h_1+h_2}{2}\right)}{1+\frac{E_2I_2}{E_1I_1}} \cdot \left(\frac{h_1}{2}\right) + \alpha_1 T = \quad (6)$$

$$\frac{-F}{E_2Bh_2} + \frac{F\left(\frac{h_1+h_2}{2}\right)}{1+\frac{E_1I_1}{E_2I_2}} \cdot \left(\frac{h_2}{2}\right) + \alpha_2 T$$

where F is resultant normal force acting over bimetal strip and can be expressed $$F = \frac{(\alpha_2 - \alpha_1)\Delta T \cdot E_1 E_2 B h_1 h_2 (E_1 B h_1^3 + E_2 B h_2^3)}{(E_1 h_1 + E_2 h_2)(E_1 B h_1^3 + E_2 B h_2^3) + 3(h_1^2 + 2h_1 h_2 + h_2^2)(E_1 E_2 B h_1 h_2)} \quad (7)$$

The bending moment of material 1 and 2 can be computed as $$M_1 = \frac{F\left(\frac{h_1}{2} + \frac{h_2}{2}\right)}{1 + \frac{E_2 I_2}{E_1 I_1}} \quad M_2 = \frac{F\left(\frac{h_1}{2} + \frac{h_2}{2}\right)}{1 + \frac{E_1 I_1}{E_2 I_2}} \quad (8)$$

respectively. In the equations [6]–[8], E,h,I, α are Young's modulus, thickness, moment of inertia, thermal expansion coefficient, respectively. Subscript 1 denotes the bimetal material number 1 while 2 represents the bimetal material 2. B is width of the assembly. The deflection of the end of the bimetal beam owing to the temperature changes is given by $$\delta_T = \frac{L^2}{2} \cdot \frac{1}{R} = \frac{M_1 L^2}{2 E_1 I_1}. \quad (9)$$

We further assume that the bimetal elastic beam and holding arm undergo small deformations and thus the deformation projected on the fiber direction is approached as $$\frac{\delta_T}{L} \cdot L_a (1 + \alpha_a \Delta T).$$

$L_a$ and $\alpha_a$ are length and thermal expansion coefficient of the holding arm, respectively. Since the structure must be in static equilibrium, the extension of fiber core is equal to the displacement of the bimetal structure during temperature changes. Expressed algebraically, $$\frac{\Delta F L_f}{A_f E_f} + \alpha_f L_f \Delta T = \frac{\delta_T}{L} \cdot L_a (1 + \alpha_a \Delta T). \quad (10)$$

The thermal-induced resultant force, $\Delta F$, acting on the grating fiber is expressed as the function of temperature change, $$\Delta F = \frac{A_f E_f}{L_f}\left[\frac{\delta_T}{L} \cdot L_a (1 + \alpha_a \Delta T) - \alpha_f L_f \Delta T\right]. \quad (11)$$

Substituting Eq.(11) to Eq.(3) and Eq.(4), we obtain $$\alpha_{eff} \cdot \Delta T + \alpha_F \cdot \frac{A_f E_f}{L_f}\left[\frac{\delta_T}{L} \cdot L_a (1 + \alpha_a \Delta T) - \alpha_f L_f \Delta T\right] = 0 \quad (12)$$

With experimentally obtained coefficients $\alpha_{eff}$ and $\alpha_F$, Eq. (12) provides the solution for all required dimensions used in the bimetal compensated structure.

Constrains for a Small Deformation

The bimetal beam deflections determined earlier was satisfactory provided that the slopes of the beam are small. To provide a better prediction of packaging dimension, the structure must be rigid enough to follow the small deformation theory. For a cantilever beam with a vertical point load at the end, we have $$\frac{F_f \cdot L_a^2}{E_a I_a} \leq 0.2 \quad (13)$$

where subscript a denotes the holding arm.

Packaging Preparation

The uniform fiber gratings (Hydrogen loaded SMF-28 from corning, USA) approximately 21 mm long were written with a phase mask and an excimer laser (operating at 248 nm. The designed central wavelength was 1542 nm with a 530 nm Bragg spacing on the mask. Re-coating was applied in the process to insure the stability of central wavelength. The finished grating fiber was then placed in temperature controlled chamber. With spectrum analyzer (ANDO,AQ-6315A) and light source (EXFO, FLS2100), the temperature dependence of reflection spectrum can be measured.

Variation of Bragg wavelength with temperature for a free fiber grating is found to be $\alpha_{eff}$=0.0086 nm /° C. (or 5.584×10$^{-6}$/° C. at 1540 nm). Similar results can be found in Yoffe's work (7.5×10$^{-6}$/° C. at 1520 nm)and Fang's work (7.83×10$^{-6}$/° C. at 1553 nm).

To facilitate the computation, $\alpha_F$ must be acquired through a simple tensile testing with measurement of applied force. The computed slope is known as force constant and is 0.7 nm/N (or 4.545×10$^{-4}$/N) in our experiment.

Figure 3:
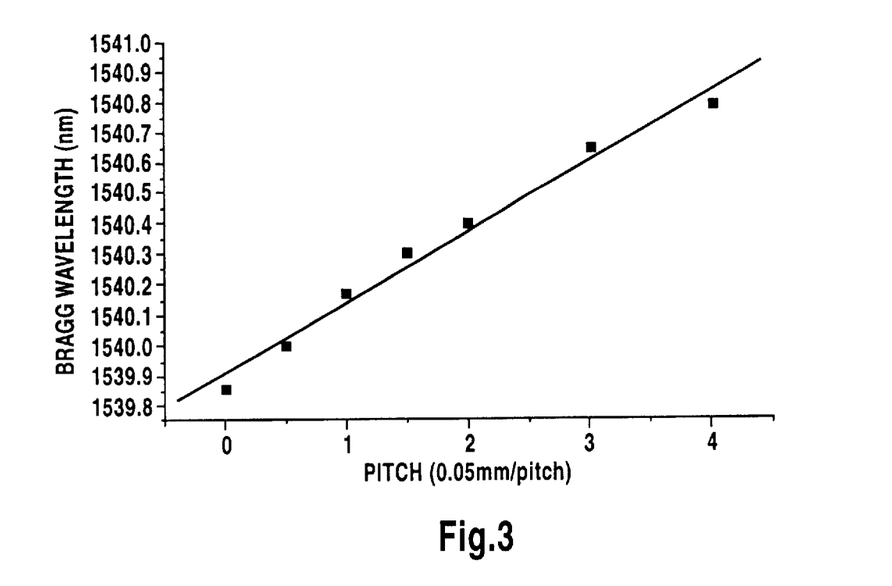
FIG. 3 is a schematic diagram showing variation of Bragg wavelength with controlled differential pitch-movement.

To assemble the package, the bare grating fiber 60 is attached to the end of holding arm 27 while the other end is embedded in the moving pin 10. To demonstrated the tuning mechanism provided in this package, the rotation sleeve 30 is screw down to apply a small amount of tension on the grating fiber 30. FIG. 3 shows the change of central reflected wavelength of the grating to the screw pitch (i.e., 1 pitch= 0.05 mm). The central wavelength can be precisely controlled up to 0.059 nm/90° in our mechanism. The tune-up precision can be improved if the holding arm 27 is more flexible as we derived from Eq. 5.

The amount of pre-stress (or wavelength shift) required to make the grating fiber in tension condition is computed as a $\alpha_{eff}\times(-40°$ C.$-25°$ C.) while $\alpha_{eff}\times(80°$ C.$-25°$ C.) is needed for pre-compression condition. The pre-compression condition can result in the fiber bulking and thus, is not used in the present experiment. These pre-shift conditions can be achieved by the tune-up mechanism (i.e., approximately 1.5 pitch=0.075 mm movement in pre-tension if fiber length is 21 mm). An over-stressed grating fiber will result in optical birefringence and two-peak reflective wavelength, and thus should be avoid in the implementation of packaging.

Sensitivity Analysis of Packaging Parameters

Packaging parameters are the most interested by the designer. $L_a$, $h_1/h_2$, and $L_f$ (or L) are three major parameters in fabricating the device. The holding arm 27 is made with very low thermal expansion coefficient (i.e.,1+$\alpha_a\Delta T$≅1). So Eq.(12) is independent of temperature variation $\Delta T$. To have a zero wavelength shift, all packaging parameters must be governed by Eq.(12).

Figure 4:
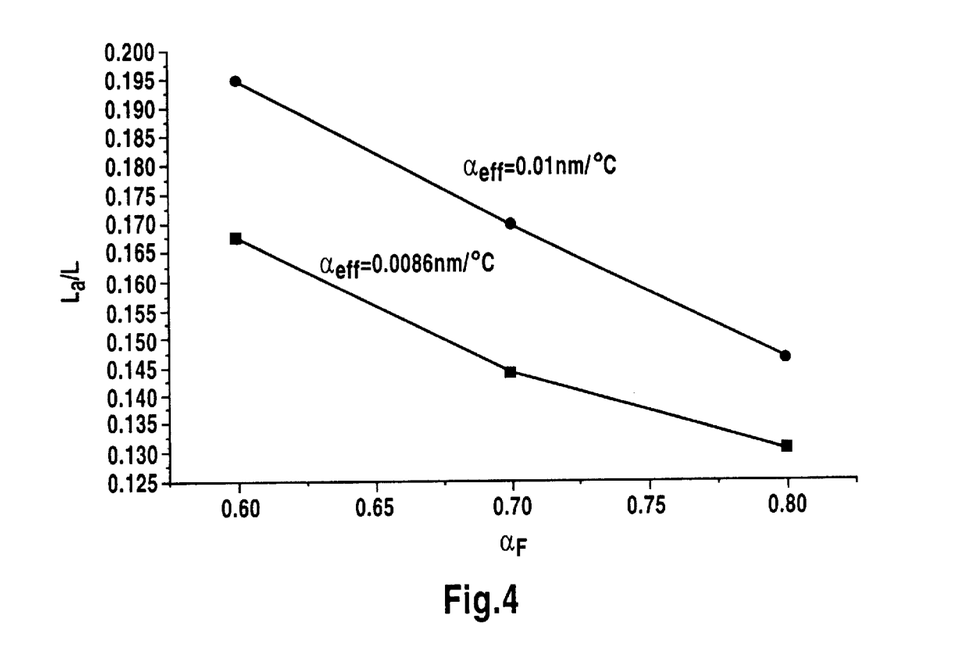
FIG. 4 is a schematic diagram showing the computed effects of temperature coefficient ($\alpha_{eff}$) and force constant ($\alpha_F$) on the holding arm length ($L_aL$). $\alpha_{eff}$ has stronger impacts on arm length than $\alpha_F$.
Figure 5:
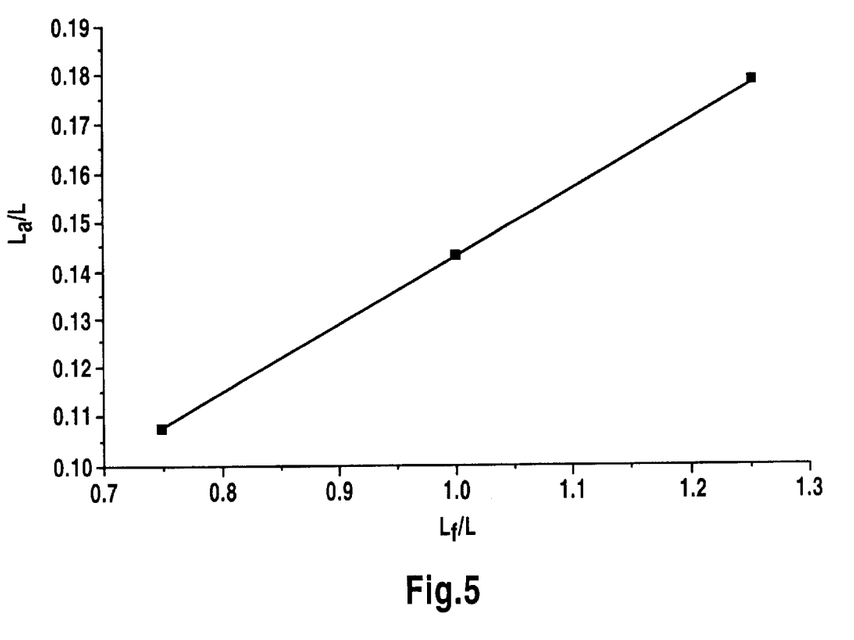
FIG. 5 is a schematic diagram showing the correlation between fiber length and holding arm obtained from Eq. 12.
Figure 6:
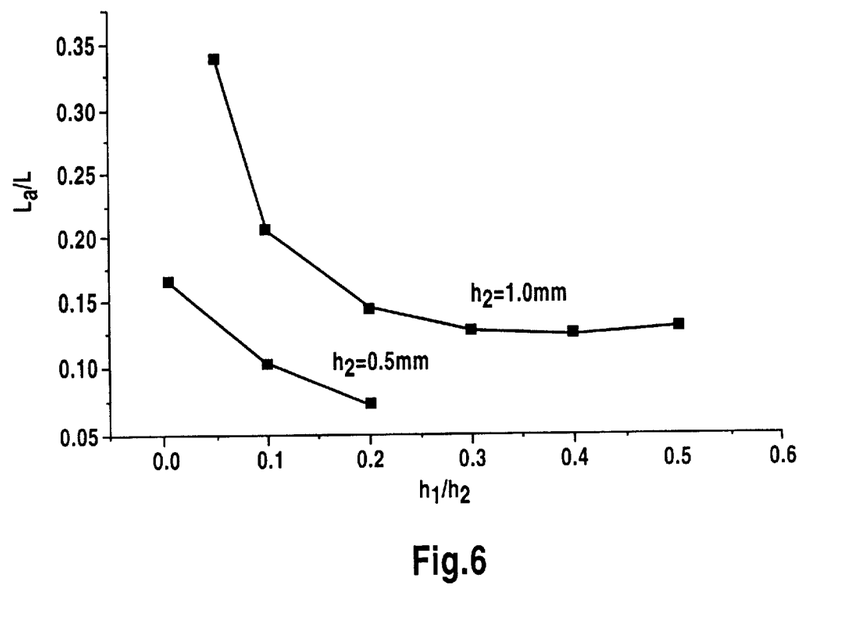
FIG. 6 is a schematic diagram showing the influences of different thickness combinations on the arm length computed from Eq.12.
Figure 9:
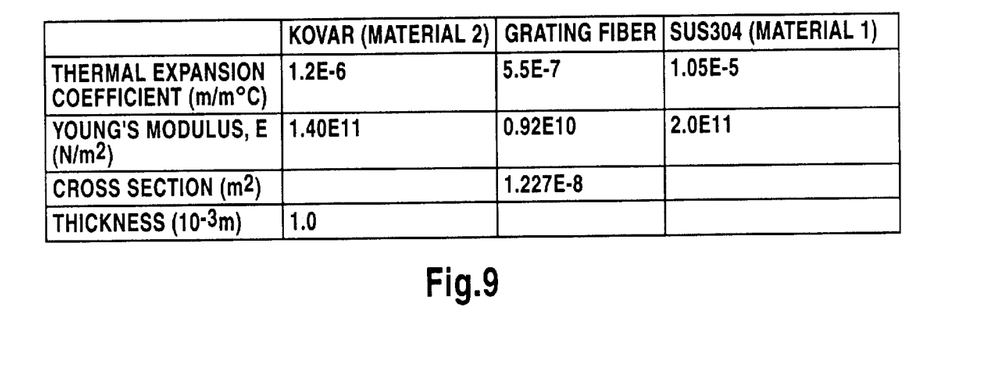
FIG. 9 a table of the material properties.

Effects of experimentally obtained force constant ($\alpha_F$) and effective temperature coefficient ($\alpha_{eff}$) on the arm length using Eq.(12) are illustrated in FIG. 4. The material properties are listed in the Table of FIG. 9. The variation of the temperature coefficient is due to the small difference in pre-stress force for control of the FBG wavelengths. 16% of $\alpha_{eff}$ perturbation results in 20% of variations in $L_a/L$. It is about 1.6 times value as we make the same amount of perturbation in $\alpha_F$. The required arm length is more sensitive to $\alpha_{eff}$ than to $\alpha_F$ and thus needs to be aware in the implementation of the package. FIG. 5 shows the correlation between fiber length and holding arm. A longer fiber length requires longer arm to compensate fiber elongation as we expected. Bimetal ratio ($h_1/h_2$) is critical in this package because it directly affects the degree of bending. In our case, the thickness of holding arm is the same as that of material in the bimetal beam. A thinner material requires longer arm length to compensate the elongated grating fiber as seen in FIG. 6. Reducing the thickness of $h_2$ to half will also reduce the required arm length to half of length. The measured force in pre-stress condition is about 0.4N in our experiment. If we take safety factor 3.0 in our computation and substitute the parameter $F_f$=1.2N and material properties listed the Table of FIG. 9, the required thickness of holding arm is about 0.137 mm. Any thickness larger than 0.137 mm keeps the holding arm in the range of small deformation.

Figure 7A:
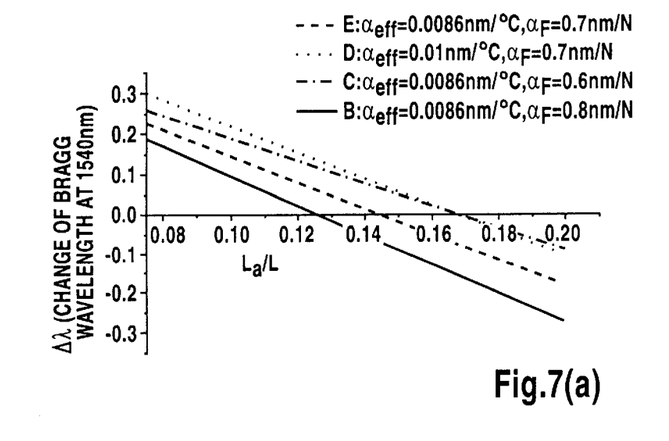
Figure 7B:
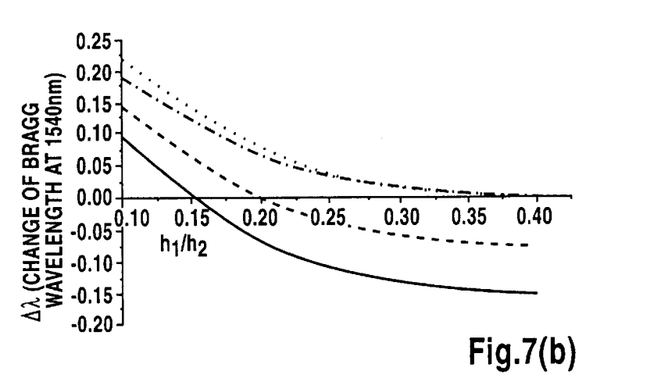
Figure 7C:
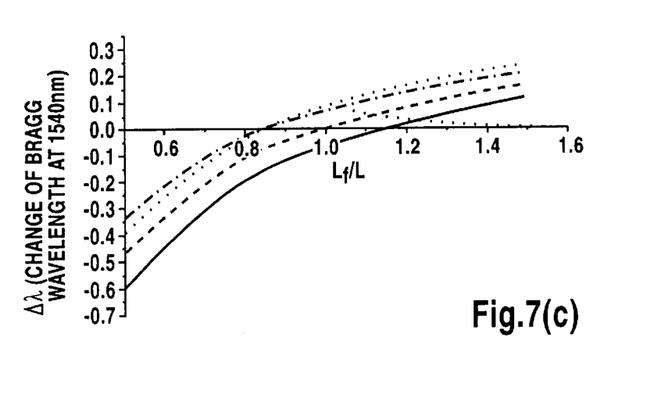

In the condition that grating is over-compensated or under-compensated, changing packaging parameters, $L_a/L$, $h_1/h_2$, and $L_f/L$, is the most effective way to resolve the problem. Effects of packaging parameters on wavelength shift, $\Delta\lambda$, at $\lambda$=1540 nm and $\Delta T$ =65° C. are illustrated in FIG. 7. $\Delta\lambda$ varies linearly with $L_a/L$ and is monotonically decreased as we increase the value of $L_a/L$ (FIG. 7(a)). The variation is in the order of 0.1 nm, which provides enough tuning capability in packaging process. The $h_1/h_2$ dependence of $\Delta\lambda$ is shown in FIG. 7(b). It exhibits the similar trend as the influence of $L_a/L$, but the variation of $\Delta\lambda$ is about half order of that in FIG. 7(a). In the conditions of C and D, $h_1/h_2$ has contribution only on the positive changes of $\Delta\lambda$. Therefore, changing the value of $h_1/h_2$ provides limited wavelength range during the packaging process. The variation of Bragg wavelength caused by perturbing the length of $L_f$, is shown in FIG. 7(c). The $L_f/L$ exhibits more tuning capability in the negative $\Delta\lambda$ than positive $\Delta\lambda$, but the tuning range is the same order as that in FIG. 7(a). Change of $L_a$ or $h_1$ requires further machining works; while changing $L_f$ can be simply accomplished by adjusting the moving pin. $L_f$ provides the most convenient way to adjust the degree of compensation. Thus, changing the length of $L_f$ is considered as the first priority among all adjustable packaging parameters.

Figure 8:
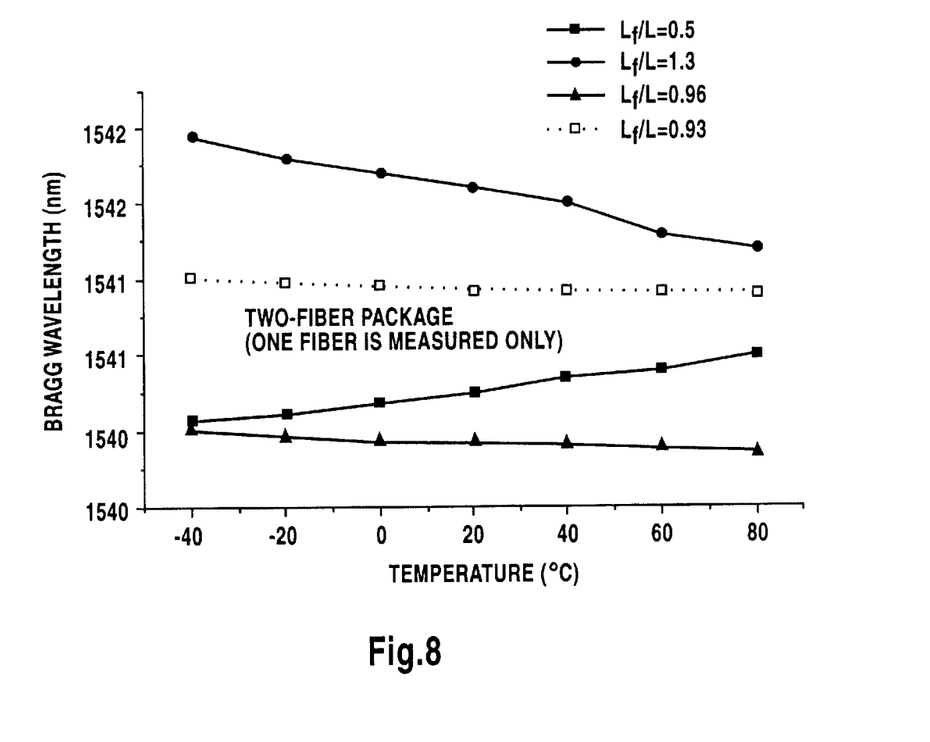
FIG. 8 is a schematic diagram showing the ariation of Bragg wavelength with temperature for the compensated fiber grating package. The fiber length is used as an adjustable parameter in the experiment. The package held the Bragg wavelength to within 0.15 nm range when we applied a proper pre-stress condition. The two-fiber package with controlled effective temperature coefficients is used and the wavelength variations is less than 0.1 nm.

FIG. 8 shows the experimental results for various $L_f/L$ ratios with pre-stress 0.08 mm elongation in single-fiber grating. The packaging parameters are listed in Table of FIG. 9. The Bragg wavelength change can be controlled within 0.15 nm during the temperature change of −40° C. to 80° C. For two-fiber packaging in parallel structure, a separate pulling force is applied to individually control each FBG for required wavelength before fibers are fixed in the moving pin. The difference of $\alpha_{eff}$ between two fibers must be controlled within a specified range so they have a uniform wavelength shift during temperature changes. In the case which package uniformity is critical in application, the modified moving pin, which incorporated two different fiber lengths, can be used in the device to achieve the best performance. No further machining work is needed in the U-shape structure. The Bragg wavelength change for two-fiber package is illustrated in FIG. 8. The variation over temperature changes can be less than 0.1 nm in our experiment.

We have demonstrated a compensated device which is relatively simple to construct, inexpensive manufacture, easy to use and yet reliable in operation. A pre-stressed grating mounted in a bimetal structure and a tune-up mechanism exhibited a total variation in Bragg wavelength of 0.1 nm over −40° C. to 80° C. temperature range. The differential pitch design provides pre-stress and post tuning capabilities in our packaging device. Furthermore, grating length ($L_f$), which can be adjusted directly by the moving pin, is used to control the degree of over/under compensations, caused by fabrication imperfection. The experimental scheme and theorem are also provided as the implementation of this compensated device. A multi-grating fiber used in the other applications can also be incorporated in this device as we have experimentally verified.

According the forgoing descriptions, the bimetal-based temperature stabilized multi-FBG package with tunable mechanism in accordance with the present invention has the following advantageous features:

(1) A nanometer-level (0.059 nm wavelength shift/90 degree) adjustment can be used to tune-up the central wavelength after the packaging is completed. This differential pitch movement can also serve as pre-stress mechanism while a fiber is fixed in this device.

(2) A bimetal-based fixture compensated element with linear motion can be used for multi-FBG applications. It cannot be achieved by using two opposite screws with different pitches. Because two screws have to make opposite rotation in order to get a differential pitch movement, it can twist the existing fiber(s) in either pre or post packaging.

(3) The grating length ($L_f$) can be adjusted directly by the moving pin to control the degree of over/under compensations, caused by fabrication imperfection.

(4) A locking mechanism is provided. No additional tools are required during pre and post tune-up stages. One can fix the package simply by tie up the guiding screw.

(5) A mark is provided on the rotation sleeve so the degree of linearly motion can be controlled precisely. Thus a desired central wavelength can be achieved easily without the help of optical spectrum analyzer.

Although the invention has been explained in relation to its preferred embodiment, it is to be understood that many other possible modifications and variations can be made without departing from the spirit and scope of the invention as hereinafter claimed.

What is claimed is:

1. A bimetal-based temperature stabilized multi-FBG package with tunable mechanism comprising:

a moving pin having a first predetermined outer screw pitch at one end and an elongated slot at the other end, a bimetal fixture having a main frame and a plate secured to the main frame, the main frame having a tube member extending outwardly with a second predetermined outer screw pitch thereon;

a rotation sleeve having a first predetermined inner thread corresponding to the first predetermined outer screw pitch of the moving pin, and a second predetermined inner thread corresponding to the second predetermined outer screw pitch of the bimetal fixture; and a locking pin disposed at the bimetal fixture for selectable engagement with the slot of the moving pin;

wherein the moving pin is disposed between the rotation sleeve and bimetal fixture with one end inserted into the bimetal fixture and the other end is screwed into the first predetermined inner thread, and then the second predetermined inner thread of the rotation sleeve is screwed onto the second predetermined outer screw pitch of the bimetal fixture, whereby when the locking pin is in a position engagement with the slot of the moving pin, the moving pin cannot self-rotate, so rotating the sleeve in one cycle will make the moving pin has a movement of the second predetermined outer screw pitch minus the first predetermined outer screw pitch, and when the locking pin is in a position not engagement with the slot, rotating the rotation sleeve 30 in 360 degrees will result in the second predetermined outer screw pitch movement of the moving pin.

2. The bimetal-based temperature stabilized multi-FBG package with tunable mechanism as claimed in claim 1, wherein the thermal expansion coefficient of the main frame is smaller than that of the plate.

3. The bimetal-based temperature stabilized multi-FBG package with tunable mechanism as claimed in claim 1, further comprising a spring disposed between the locking pin and the bimetal fixture.

4. The bimetal-based temperature stabilized multi-FBG package with tunable mechanism as claimed in claim 1, wherein the rotation sleeve is provided with marks for indicating the rotation angles of the sleeve.

5. The bimetal-based temperature stabilized multi-FBG package with tunable mechanism as claimed in claim 1, wherein the moving pin and the rotation sleeve are made by kovar with very low thermal expansion coefficient.

* * * * *